United States Patent [19]

Caldwell

[11] Patent Number: 5,189,660
[45] Date of Patent: Feb. 23, 1993

[54] OPTICAL DATA STORAGE SYSTEM WITH UNITARY FERROUS FRAME

[75] Inventor: Marcus L. Caldwell, Colorado Springs, Colo.

[73] Assignee: Tandy Corporation, Ft. Worth, Tex.

[21] Appl. No.: 697,375

[22] Filed: May 9, 1991

[51] Int. Cl.⁵ .................. G11B 21/02; G11B 17/30; G11B 17/00

[52] U.S. Cl. .................. 369/215; 369/219; 369/220; 369/244; 369/249; 360/106

[58] Field of Search ............ 369/215, 219, 220, 221, 369/244, 249; 360/104, 105, 106

[56] References Cited

U.S. PATENT DOCUMENTS

| | | | |
|---|---|---|---|
| 4,590,529 | 5/1986 | Nikaido et al. | 360/106 |
| 4,812,934 | 3/1989 | Suzuki et al. | 360/106 |
| 4,886,957 | 12/1989 | Glaberson et al. | 235/454 |
| 4,916,684 | 4/1990 | Odawara et al. | 369/215 X |
| 5,012,372 | 4/1991 | Isomura et al. | 360/106 |
| 5,043,964 | 8/1991 | Suzuki | 369/215 X |

FOREIGN PATENT DOCUMENTS

| | | | |
|---|---|---|---|
| 0293724 | 11/1988 | Japan | 369/215 |
| 2-023535 | 1/1990 | Japan | 369/215 |

*Primary Examiner*—John W. Shepperd
*Assistant Examiner*—Edward Sikorski
*Attorney, Agent, or Firm*—Stephen S. Mosher; Frederick W. Padden; Keith Hargrove

[57] ABSTRACT

A moving coil, linear positioning transducer actuator suitable for optical recording and playback devices is constructed by forming the actuator frame, magnetic pole pieces and the magnetic core of the moving coil from a single piece of ferrous material and wherein the path of the moving coil and transducer are substantially collinear. The transducer is supported by parallel rails which are mounted to the frame.

18 Claims, 3 Drawing Sheets

OPTICAL DATA STORAGE SYSTEM WITH UNITARY FERROUS FRAME

FIELD OF THE INVENTION

The present invention relates to actuators for mass data storage systems of the type which use moving coil mechanisms for positioning a recording/playback head(s) with respect to rotating media. More particularly, the invention relates to actuators of the foregoing type for optical data recording and playback systems.

BACKGROUND OF THE INVENTION

Mass data storage devices including compact disk ("CD") players or the like allow for optical recording and/or playback of audio signals from rotating media such as compact optical disks.

The typical mechanism used to move a signal pick-up device radially back-and-forth with respect to the surface of the rotating media in the mass data storage device is called an actuator. The actuator may include a baseplate or frame, a carriage, and a pick-up device, such as a recording head or a playback head, which is mounted in the carriage. The actuator also includes a motor assembly for moving the carriage with respect to the frame. The frame maintains the axis of motion of the carriage and the center of the media disc in a fixed relationship. The pick-up head/carriage assembly is supported near the surface of the media. A spindle motor is used to rotate the media disk. The actuator is thus utilized to position the pick-up head close to the desired track on the rotating media surface.

Within the pick-up head assembly is another stage of positioning apparatus which provides vernier control of the optical pick-up beam position and focus. The mechanisms used in playback machines for controlling position and focus within the pick-up head assembly are usually moving coil devices, which respond to feedback signals derived from the permanent data track in the media to apply the necessary corrections. By contrast, the pick-up head for optical recorders must be able to locate a data track upon blank media, with only a datum as a reference, and maintain uniform track spacing to enable accurate, error-free playback.

Further, there are many possible sources of error which must be overcome by the positioning mechanism in the optical data recorder. These sources of error include disk errors such as eccentricity, warping, surface flaws and variations in optical properties. Various mechanical disturbances such as external vibration must also be included in the list of potential tracking errors.

One type of ordinary actuator used in audio CD players includes a rack-and-pinion mechanism which is electrically driven and controlled. The pick-up head assembly or carriage is attached to the rack and travels on two parallel rails. These parallel rails are supported by the frame, in a plane parallel to the plane of the rotating disc. The rack is usually located outside of the rails. This method offers low manufacturing cost and simplicity. However, the rack-and-pinion parts are subject to wear, requiring frequent lubrication and adjustment. Rack-and-pinion actuators do not provide high precision OF motion of the actuator which is desired especially in high quality recording apparatus. Inevitable wear and manufacturing tolerances applied to mass-produced equipment further reduce the precision available from this type of actuator. Other problems with the rack-and-pinion actuator include gear backlash and poor seek times. The latter problem is an unavoidable result of the high-reduction gear ratio required to move a relatively large mass.

Other audio compact disc players employ moving coil actuators to obtain more accurate positioning of the optical playback head. A representative type has a magnetic driving circuit consisting of a movable drive coil and a stationary core. The drive coil is attached to the side of the playback head carriage assembly at a point outside of and adjacent to one of the parallel supporting rails similar to the rack-and-pinion system described above. The drive coil or solenoid, when electrically energized by a predetermined tracking signal, moves along and over the core, which is also parallel to the carriage rails. This moving coil mechanism, often called a voice coil, improves the positioning accuracy, reliability and performance of the playback head actuator by eliminating all of the free play and wear characteristics of the rack and pinion.

There are two inherent sources of error in the actuator designs described above. One is the offset application point of the force used to move the head carriage. When the driving force is applied at any point other than the center of gravity, Cg, and the center of friction resistance, a moment (or torque) is created on the carriage. This results in servo errors and/or unwanted resonances. Also, any slight misalignment of the rails may introduce binding of the head carriage motion or other friction effects with resulting dissipation of heat in the bearings and the solenoid winding. The impeded motion and uneven wear together with the energy losses can result in unacceptable tracking performance. These effects typically degrade even further with length of service.

The second, more serious source of error is the lack of perfect rigidity of the assembly comprised of the head carriage and the arms which support the drive coil or solenoid. Flexing of the solenoid support arms limits the resolution of the system. A number of design tradeoffs must be made to solve this problem. For example, the solenoid support arms may be made larger or more massive to increase their stiffness; but the increased mass will slow the response time and require stronger magnets and/or require higher current in the solenoid coil. Stronger magnets add cost. And higher current may require more expensive construction of the solenoid coil or a higher capacity power supply. This approach also effectively reduces system bandwidth. Alternatively, the solenoid support arms may be fabricated of a stiffer, lighter-weight material but at increased cost.

Yet another type of moving coil actuator found in rigid magnetic disc peripherals and compact audio players supports the pick-up on one end of a pivoting arm and the moving coil on the opposite end of the pivoting arm. The arm is usually pivoted at a point closer to the end attached to the moving coil. This moving solenoid coil, which is mounted at right angles to the long axis of the pivoting arm, and energized by a predetermined tracking signal, moves in an arc about the pivot. Likewise, the pick-up head moves in an arc next to the media surface approximately along a radius of the rotating media. These curved paths of motion complicate the actuator and compromise the path of the optical pick-up head, thereby requiring equalization apparatus to compensate for this curved path.

Heretofore unrealized is an actuator assembly for an optical record and playback device which overcomes the above shortcomings in precision, complexity and cost of manufacture.

Accordingly, it is an object of the invention to provide a linear moving coil actuator capable of highly accurate positioning of the optical recording head.

It is further an object of the invention to provide a linear moving coil actuator of relatively simple construction which can be manufactured in a minimum number of steps, in high volume and at low cost.

It is yet a further object of the invention to provide a linear moving coil actuator for an optical recording device employing a baseplate and magnetic structure of unitary design.

SUMMARY OF THE INVENTION

The above and other objects of the present inventions are achieved as follows:

A linear, moving coil, transducer positioning actuator suitable for the high-precision requirements of optical recording is constructed by forming the actuator baseplate or frame, magnetic pole pieces and the magnetic core of the moving coil from a single piece of ferrous material and by locating the moving coil's path closely coincident with the required line of motion of the optical transducer itself.

The mechanical compliance, K', of the actuator and frame assembly is greatest in the axis defined by the axis of linear motion. A first order approximation of the system resonance fr, is given by:

$$f_r = \frac{1}{2\pi} \sqrt{\frac{K'}{M}}.$$

Therefore, for a given moving mass M, a high K' means increased performance.

This unitary design of the frame and magnetic pole pieces also provides a low-cost actuator which has high inherent stability, rigidity, and high bandwidth for accurate tracking performance in an optical recorder because it combines the frame and stationary magnetic structure in a single easily fabricated part. Also, since tolerances of this one-piece design can be easily controlled, the optimum magnetic gap can be provided with high repeatability in manufacturing. Furthermore, the colinear alignment of the solenoid coil and head carriage assembly results in more direct, error-free motion of this assembly, thus contributing to the overall bandwidth and stability of its tracking performance in an optical record and playback device. In other words, the center of gravity, Cg, driving force and maximum mechanical stiffness are co-axial. Friction loses and wear are also reduced.

While the present invention in its preferred embodiment is directed toward a unitary actuator frame and magnetic structure for an optical recorder or player it is to be understood that the principles incorporated in the present invention can equally well be applied to recording and playback head actuators for other types or configurations employing rotating, translating or fixed media, examples of which include an optical disk, a translating strip, and a stationary card, respectively.

Other objects, features and advantages of the invention will become apparent in the detailed description that follows. Various changes or modifications to the invention described herein are possible within the scope of the present invention and will become apparent to those skilled in the art. The drawings and the descriptions included herein are intended to illustrate the present invention and not in way construe or limit the scope of the present invention.

DETAILED DESCRIPTION OF THE INVENTION

Figure 1:
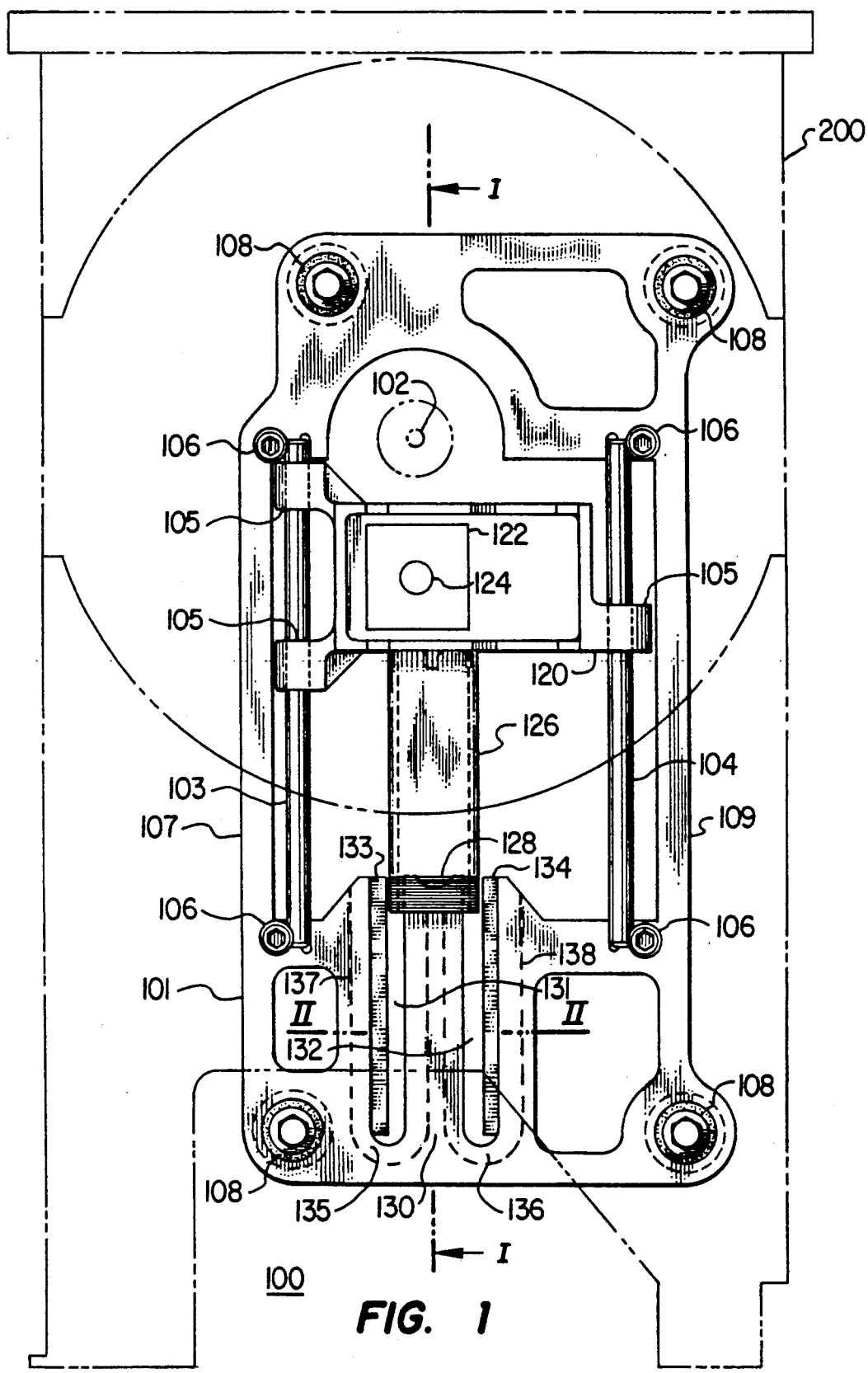
FIG. 1. is a plan view of the preferred embodiment with a one-piece or unitary actuator frame and magnetic structure according to the principles of the present invention.
Figure 2:
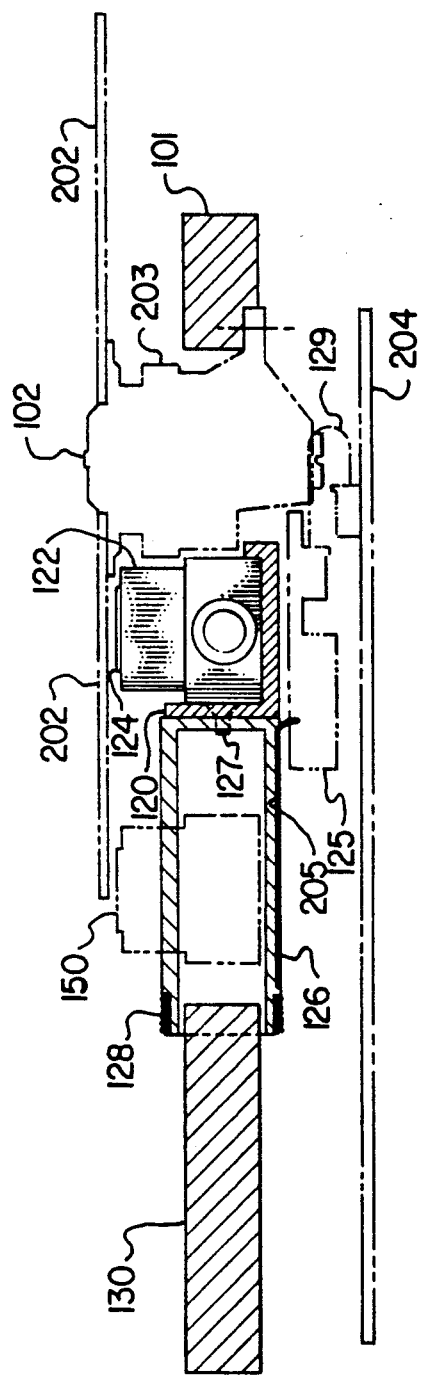
FIG. 2. is a longitudinal section view of the preferred embodiment taken along line I—I of FIG. 1.

Referring to FIG. 1 and FIG. 2 the preferred embodiment will now be described. In this description, the words frame and baseplate will be used interchangeably. Similarly, the terms moving coil, solenoid or solenoid coil, voice coil and drive coil may be used interchangeably. FIG. 1 shows a plan view of a moving coil actuator assembly 100 according to the present invention. The actuator is shown in a position relative to the media tray 200 typically found in a compact disc playback apparatus. The actuator frame or baseplate 101 is supported and attached to the equipment chassis by shock mount 108 assemblies at the locations shown. The construction of shock mount 108 is well known in the art and will not be described further. Actuator baseplate 101 is positioned in a fixed relationship with respect to the center 102 of rotation of the media disk. This is normally accomplished by mounting the baseplate 101 on a common chassis with the spindle motor 203 which rotates the media disk 202 about center 102. The spindle motor 203 and media disk 202 are shown only in FIG. 2 for clarity.

Referring further to FIG. 1 the left guide rail 103 and right guide rail 104 are secured to the actuator frame 101 by the set screws 106 which permit removal for ease of cleaning during servicing. Supported by the left guide rail 103 and right guide rail 104 is the head carriage 120 which slides freely along the guide rails 103 and 104 by means of the three sleeve bearings 105 inserted in the head carriage 120. Mounted in the head carriage 120 is the optical head 122 which includes the recording and playback transducer. In the preferred embodiment of the present invention the optical transducer includes a laser with associated optics and an objective lens 124. The optical transducer used in the present invention is of a type readily available and need not be further described herein. Also contained within the optical head 122 but not shown for clarity are such actuating mechanisms as are necessary for vernier tracking and focusing of the optical transducer.

The primary purpose of the head carriage 120 is to support the objective lens 124 close to the location where it is desired to record or read a data track on or from the storage media disc. The storage media disc, which is not shown in FIG. 1 for clarity, is supported by spindle 102. The objective lens 124 focuses the laser beam upon the storage media disc to accomplish the recording, erasing or reading of data. The laser beam originates within the optical head 122.

Rigidly attached to the head carriage 120 is a hollow coil form or bobbin 126 of rectangular cross-section which has a solenoid coil 128 wound around a first end of the bobbin 126 opposite the second end of the bobbin 126 which is rigidly attached to the head carriage 120. Therefore, the solenoid coil 128, bobbin 126 and head carriage 120 are able to move together as a unit along the guide rails 103 and 104 throughout the length of the guide rails 103 and 104 as permitted by the boundaries of the actuator baseplate 101. The range of motion or stroke of the head carriage 120 is determined by the radial distance between the innermost track location of the storage media disc and the outermost track location of the storage media disc.

The actuator baseplate 101 is formed from one piece of ferrous material with parallel slots 131 and 132 which provide a member between them called a core 130. The dimensions of the core 130 are devised to permit the bobbin 126 to slide over and along the core 130 for a distance slightly greater than the stroke of the head carriage 120. The width of the parallel slots 131 and 132 are devised to permit the left magnet 133 and right magnet 134 to be attached to the side of each slot away from and facing the core 130. The left magnet 133 and right magnet 134 are identical permanent magnets. Permanent magnets 133 and 134 are disposed in a preferred embodiment so that their North poles are facing the core 130 and the South poles are attached to the actuator baseplate 101. This choice of polarity of the magnets 133 and 134 is arbitrary. It is important that they have the same polarity with respect to the core 130. With the magnets 133 and 134 in place, sufficient clearance remains to permit the solenoid coil 128 to pass freely between them as it moves along the core 130. The clearance between the North pole of each magnet 133 or 134 and the core 130 will be referred to later in FIG. 3 as the magnetic field gap 131a or 132a respectively.

A significant feature of the actuator 100 of FIG. 1 is that the magnetic pole pieces of the preferred embodiment of FIG. 1 are not separate pieces but rather are defined as the regions 135 and 136 of the one-piece or unitary actuator baseplate 101 disposed adjacent to the magnets 133 and 134, curving around the closed ends of parallel slots 131 and 132 as denoted in FIG. 1, and thence into the core 130. The approximate outer boundary of each of the pole piece regions 135 and 136 is indicated by the dashed lines 137 and 138 in FIG. 1. These outer boundaries of the pole-piece regions 135 and 136 are mentioned to illustrate the approximate locus of the magnetic field within them in order to understand the operation of the present invention.

It can now be seen that the portion of the actuator baseplate 101 just described resembles a magnetic E-core which is used to configure the magnetic field required to operate the solenoid coil 128. More particularly, this magnetic E-core can be defined in the ferrous material of the actuator baseplate 101 within the regions designated as the core 130 and the pole piece regions 135 and 136 in combination with the end portion of the actuator baseplate 101. These regions respectively comprise the center leg, the two outer legs and the common member of the magnetic E-core. The magnetic field is established by the two permanent magnets, 133 and 134, mounted on the surface of each "outer leg" directly opposite the "center leg". The magnets 133 and 134 are oriented with their North poles facing the "center leg" to establish the magnetic field in the gaps 131 and 132 between the North pole of each permanent magnet and the "center leg". The two resulting magnetic flux circuits are completed via the path along the "center leg" or core member 130, thence diverging respectively along the common member 139 toward the "outer legs" previously designated as the pole piece regions 135 and 136, and finally returning to the South poles of the two permanent magnets 133 and 134. It will be seen that the flux of the magnetic field originating from each permanent magnet 133 and 134 circulates in each respective loop.

From the foregoing it can be seen that the actuator baseplate 101 with integral pole piece regions 135 and 136 and core member 130 thereby form a unitary structure; that is, a single piece of ferrous material such as low carbon steel functions as both supporting and magnetic structure. In addition, the greater mechanical inertia provided by the more massive steel baseplate, as compared to an actuator baseplate fabricated of lightweight materials such as aluminum or plastic, permits more of the energy of the solenoid coil 128 to be directed into the motion of the head carriage 120 with a corresponding improvement in efficiency and accuracy. Further, the colinear alignment of the solenoid coil and head carriage axes eliminates tracking inaccuracies and the loss of drive energy that results when the head carriage driving force is offset from the path of motion of the head carriages in previous actuators.

FIG. 2 illustrates the same embodiment of FIG. 1 in a cross-section view through the longitudinal centerline I—I of FIG. 1 to show several other key relationships. The head carriage 120, which includes the optical head 122, is secured to the bobbin 126 by screw 127. It is contemplated that other embodiments of the present invention could employ one-piece bobbin/head carriage designs for simpler assembly, lower cost, etc. Also shown are the spindle motor 203 with a storage media disk 202 placed over the spindle 102. Further, the head preamp 125 is shown connected to the servo/analog printed circuit board (pcb) 204 by flex circuit 129, and the leads 205 from the solenoid coil 128 are routed via the head preamp 125 and flex circuit 129 to the servo/analog pcb 204. Finally note the broken outline position 150 of the optical head 122 corresponding to its location furthest from the center of the media disk 202 under the outermost data track. The distance between the optical head 122 and the outline 150 represents the aforementioned stroke of the voice coil/head carriage assembly.

The actuator baseplate 101 of the unitary magnetic structure can be fabricated by any of several established manufacturing methods. These methods include fine line blanking, sintered metal, investment casting and metal-injection molding.

Fine line blanking, which is essentially a two-stage stamping process, is well suited to high volume production and is capable of fabricating close tolerance pieces. If this method is used, an intermediate annealing step can improve the grain orientation of the steel material following the first-stage blanking operation. The major benefit of the resulting homogeneous grain orientation is more uniform magnetic characteristics among all baseplates, thus achieving closer correspondence between the design and the fabricated parts of the magnetic circuit.

The sintered metal process, which compresses a powdered material under specific temperature and pressure conditions, can economically produce a close tolerance, magnetically homogeneous part. However, the core 130 and the baseplate side members 107 and 109 (see FIG. 1) may lack the necessary longitudinal strength required to maintain core alignment and baseplate rigidity in the unitary magnetic structure design. In addition, the flux carrying capacity, remanence, is reduced with this process.

Investment casting, a process similar to the lost wax method, and metal injection molding are both capable of fabricating close tolerance, strong and homogeneous parts but are relatively expensive and thus not as well suited to a mass produced consumer product. While metal injection molding has good material properties, it is best suited to forming smaller parts and parts with minimum wall thickness.

After briefly discussing the tracking demands of an optical recorder the design of the magnetic assembly will be described.

A typical optical disk player for playback of audio CD disks employs a two stage tracking mechanism. The first stage, or coarse actuator, in a CD player positions the head carriage essentially by seeking or stepping radially from track to track. This positioning action required very little bandwidth since the smallest unit of position differentiation is the same as the 1.6 micron track spacing. The second vernier' stage, contained within the head carriage, keeps the optical pick-up head aligned with a specific track and within focusing range between the two adjacent tracks despite the radial disturbances or displacements caused by variations in the media disk and/or disk rotation mechanism or transport. This second stage requires a bandwidth of 300 to 400 Hz. to provide (a) the necessary acceleration to overcome runout displacements and (b) the resolution to restore alignment with sufficient precision. Typical maximum runout specifications on CD player are +/−144 micron over a rotational speed range 240 to 600 rpm. Typical maximum lateral mistracking deviations range up to approximately +/−0.5 micron.

It is important to realize that following a pre-existing track during playback of a disk rotating at 500 rpm (equivalent to a rate of 8.33 Hz.) with an access time on the order of 1000 milliseconds presents fewer obstacles to tracking than recording. However, since runout tends to be highest in prerecorded audio CD disks, a high acceleration capability is required; hence the 300 to 400 Hz. bandwidth of the second stage.

The tracking demands of an optical disk recorder are significantly different, especially for a system which must be usable for both audio and other forms of encoded data. Primarily, recording the data track, bit-by-bit, on a blank disk requires that the head carriage must keep the objective lens exactly in position within +/−0.1 micron relative to some predefined reference in order to maintain correct and consistent bit placement during recording. In addition, in order to be marketable as a data storage medium, the time required to seek the required track and acquire the data (which together comprise access time) must be on the order of several tens or hundreds of milliseconds. Thus in recording applications a mechanical bandwidth of several hundred Hertz is required in the first stage of the actuator. The present invention provides a mechanical bandwidth of 100 Hz., sufficient for the tracking demands of CD audio recording where the smallest unit of position differentiation is the permissible misalignment of the data frame along a tracking path. With further refinement of this invention, up to 300 Hz. bandwidth is possible for use in CD data recorders.

For example, as described earlier, the tracking mechanism for audio applications must have sufficient response to follow repeatable total run-outs of +/−144 micron in a CD recorder or player while rotating at speeds up to 8.33 Hz. This wide latitude tracking capability can be provided with high resolution in a single stage actuator because of the compact, high energy, coaxial moving coil design of the present invention. This design employs a minimum of easily manufactured parts which permits their economical manufacture to close tolerances. The high mechanical bandwidth results from the coaxial actuator design and the unitary pole-piece/baseplate structure.

Returning to FIG. 1, the design of the magnetic assembly consisting of the bobbin 126, the solenoid coil 128, the core 130 and pole-piece regions 135 and 136, and the permanent magnets 133 and 134 will be described.

In the present invention, the basic equations relating the motion of the solenoid coil 128 and the electrical energy required to produce it are:

$$F = mA \text{ and } F = NBLI$$

where F=the force required to accelerate the voice coil/head carriage assembly of mass m, N is the number of turns of the voice coil, B is the strength of the magnetic field, L is the length of wire in one turn passing through a magnetic field set up between the two permanent magnets and the core, and I is the current in the solenoid coil 128.

The design may proceed by any of several well-known procedures. For example, in the present embodiment, the compact dimensions place constraints on the physical size of the core 130, solenoid coil 128, bobbin 126, permanent magnets 133 and 134, etc. This provides a convenient starting point for determining the size of solenoid coil 128. In this example the baseplate design permits a core cross-section of 10 mm×10 mm and the CD disk specification requires a solenoid coil stroke length of 35.5 mm. Thus the bobbin dimensions are set at approximately 11 mm×11 mm×45 mm. Likewise, the magnets will be about 10 mm×45 mm with the length to be determined by the magnetic material and electrical energy available. The second derivative of an expression for runout (a periodic function for a rotating disk) yields an estimate of the peak acceleration required of the actuator; and the head carriage mass may be estimated from known or measured assemblies. Working from these initial assumptions through several iterations provides a design solution.

In the preferred embodiment the following dimensions and parameters produce the desired result.

| actuator | |
|---|---|
| moving mass, m | 60 gm |
| drive current, I | 0.5 Amp |
| drive voltage, V | 12.0 Volt |
| seek time, Ts | 40.0 millisec |
| stroke, x | 35.5 mm |
| solenoid coil | |
| number of turns, N | 270 |
| wire size | 34 AWG |
| coil length, Lc | 5.5 mm |
| winding fill factor, | 0.74 |
| resistance, | 10.9 ohms |
| bobbin length, Lb | 43.0 mm |
| bobbin width × height, wb × hb | 11.0 × 14.0 mm |
| permanent magnet | |

-continued

| material | Valcomax 351 |
|---|---|
| L × W × H | 2.5 × 42.5 × 10.0 mm |
| gap length, lg | 3.0 mm |
| gap area, Ag | 430. mm |

Figure 3:
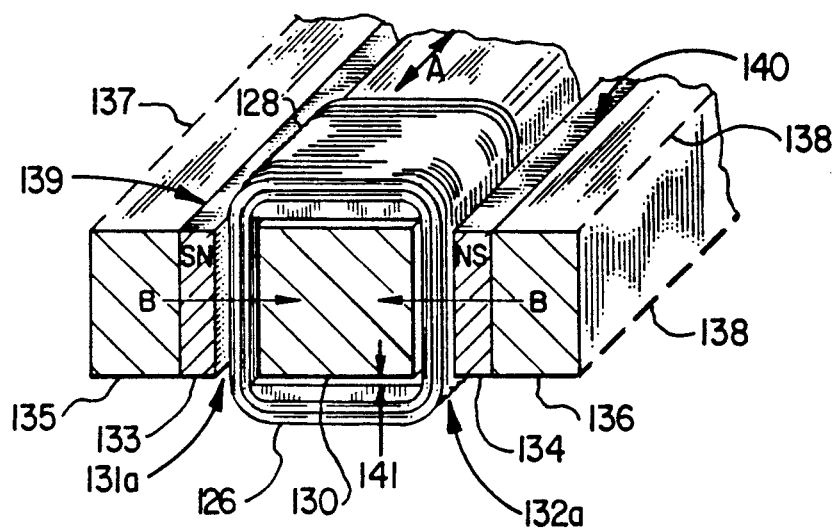
FIG. 3. is an enlarged, broken away perspective view of the moving drive coil or solenoid used in the preferred embodiment taken along line II—II of FIG. 1.

With the aid of FIG. 3 the solenoid coil magnet assembly will be descried. FIG. 3 is drawn with the solenoid coil 128 shown in mid-stroke near the cross-section indicated II—II in FIG. 1. The direction of motion of the solenoid coil 128 is indicated by the arrow 'A' in FIG. 3. The direction of the magnetic fields in the gaps 131a and 132a established by permanent magnets 133 and 134 is indicated by the two arrows identified by 'B' in FIG. 3. The solenoid coil bobbin 126 slides freely along core 130 with no friction due to the bobbin clearance 141 and the hard-surface, wear-resistant properties of the bobbin 126 and the core 130. The dimensional stability of the glass-filled polycarbonate and the low carbon steel respectively permits a nominal bobbin clearance 141 of 0.05 mm in the preferred embodiment. This close-tolerance bobbin clearance 141 minimizes any rocking motion of the bobbin 126 as it slides along the core 130.

Referring further to FIG. 3, the solenoid coil 128 is wound on bobbin 126 using no. 34 AWG magnet wire with polyester/polyide single build insulation, preferably with a coil winder to ensure uniform layers free of bulges within the gaps 131a and 132a. As shown in FIG. 2, the leads 205 to the solenoid coil 128 are preferably routed and cemented in a groove along the lower surface of the bobbin 126 and are connected to the actuator drive circuitry on the servo/analog pcb 204 as explained earlier.

Continuing with FIG. 3, the permanent magnets 133 and 134 are identical in size and shape. They are fastened to the mating pole-piece surfaces 139 and 140 of baseplate 101 in the preferred embodiment with a thin film of high-strength adhesive. The permanent magnets 133 and 134 may be formed with small locating holes which fit over corresponding locating pins provided on the mating surfaces 139 and 140 of the baseplate 101. The preferred material for the permanent magnets 133 and 134 is Vacodyne 351 available from Siemans Components, Inc., Iselin, N.J. A suitable alternative is Crumax 322 manufactured by Colt Industries, Crucible Magnetics Division, Elizabethtown, Ky.

In the preferred embodiment the magnetic field is established by permanent magnets. In other embodiments, non-permanent magnets could be used which are electrically energized to establish the desired magnetic field. Such electro-magnets, the design of which is well-known in the art, would provide an additional means of controlling the transducer in this invention.

Having described a preferred embodiment of the present invention herein, numerous other embodiments and modifications thereof are contemplated as falling within the spirit and scope of the present invention as defined by the following claims.

What is claimed is:

1. Apparatus for optically recording and playback of data on an article of optical media comprising:
   transport means for supporting and imparting predetermined motion to said optical media;
   optical transducer linearly translatable relative to said optical media for writing and reading data;
   electric solenoid means attached to said optical transducer for providing said linear translation of said optical transducer;
   magnetic means for establishing a magnetic field on at least two opposite sides of said electric solenoid means; and,
   unitary frame, attached to said transport means, for supporting said optical transducer and said magnetic means, and providing a magnetic core for said magnetic field, said unitary frame being of ferrous material and including defined near one end therein a magnetic E-core comprising parallel outer legs and a center leg conjoined at one end by a common member substantially at right angles to said legs.

2. Apparatus as defined in claim 1 wherein:
   said magnetic means includes bar magnets attached to said outer legs of said unitary frame means in proximity to said center leg.

3. Apparatus as defined in claim 1 wherein:
   said electric solenoid means is coaxially disposed over said center leg.

4. Apparatus as defined in claim 1 wherein:
   said optical transducer, being attached to said electric solenoid means, is slidably supported by and between parallel rails attached to said unitary frame means thereby permitting said linear translation.

5. Apparatus as defined in claim 1 wherein:
   said optical transducer and said electric solenoid means move together along an axis substantially colinear with said center leg when said electric solenoid means is electrically energized in a predetermined manner.

6. Apparatus as defined in claim 1:
   wherein said article of optical media comprises a rotating disk.

7. Apparatus as defined in claim 1:
   wherein said article of optical media comprises a translating strip.

8. Apparatus for optically storing and retrieving data including:
   transport means for supporting and imparting predetermined motion to an article of optical media;
   optical transducer means for writing, reading and erasing data respectively to and from said optical media;
   a baseplate formed of ferrous material and attached to said transport means, said baseplate having a magnetic E-core region defined by first and second outer legs and a third center leg wherein said center leg provides a magnetic core;
   parallel rails mounted on said baseplate for slidably supporting said optical transducer means relative to said optical media; and
   solenoid coil means connected to said optical transducer means for providing linear motion of said optical transducer means relative to said optical media when electrically energized in a predetermined manner within a magnetic field established substantially about said magnetic core.

9. The apparatus defined in claim 8, wherein:
   said baseplate means further includes first and second magnets attached to said first and second outer legs and facing said center leg for establishing said magnetic field between said first and second magnets and said magnetic core for said solenoid coil means.

10. The apparatus defined in claim 8, wherein:
    said parallel rails are substantially colinear with said first and second outer legs.

11. The apparatus defined in claim 8, wherein:
said solenoid coil means moves coaxially along said magnetic core when electrically energized.

12. A transducer actuator for an optical playback apparatus comprising:
- a frame formed of a single homogeneous component and of ferrous material and shaped at one end to define a one-piece magnetic E-core region having first and second outer legs and a center leg;
- an optical transducer slidably supported relative to said frame by parallel rails colinear with said outer legs said parallel rails being mounted on said frame;
- a magnet attached to each outer leg and facing said center leg of said E-core for establishing a magnetic field in the region between each said outer leg and said center leg;
- a solenoid coil coaxially disposed over said center leg in close proximity to said magnets and attached to said optical transducer, wherein said solenoid coil moves coaxially along said center leg when electrically energized in a predetermined manner thereby causing linear translation of said optical transducer.

13. A transducer for an optical playback apparatus comprising:
- a unitary, homogenous, ferrous frame including an E-core defined therein, substantially parallel first and second outer members and a third, shortened center member parallel to said outer members such that said first and second outer members are joined at both ends and each includes a smooth rail, said smooth rails also being parallel with each other and supporting an optical transducer slidable thereon, said optical transducer including a solenoid coil attached at one end to said optical transducer and further disposed coaxially along said third, shortened center member of said E-core, said E-core further including magnets attached to said first and second outer members opposite to and facing said third, shortened center member for establishing a magnetic field in regions between said magnets and each side of said third, shortened center member such that said solenoid coil and said optical transducer are linearly translated together along a path parallel with and substantially between said rails when electrically energized in a predetermined manner, and wherein said optical transducer is caused to move adjacent a surface of an article of optical media positioned in proximity to said optical transducer for reading data therefrom while said article of optical media is caused to move in a predetermined manner by a transport means.

14. A transducer for an optical recording or playback apparatus as defined in claim 13, wherein aid article of optical recording media comprises a rotating disk.

15. A transducer or an optical recording or playback apparatus as defined in claim 13, wherein said article of optical recording media comprises a translating strip.

16. A transducer for an optical recording or playback apparatus as defined in claim 13 wherein said article of optical recording media comprises a stationary card, wherein said transport mechanism positions said stationary card for access by said optical transducer.

17. Apparatus as defined in claim 12 or 13 wherein said optical transducer further comprises means for recording data on said optical media.

18. Apparatus as defined in claims 1, 12, or 13 wherein said optical transducer further comprises means for erasing data on said optical media.

* * * * *